United States Patent
Roberts

(10) Patent No.: US 9,730,294 B2
(45) Date of Patent: Aug. 8, 2017

(54) LIGHTING DEVICE INCLUDING A DRIVE DEVICE CONFIGURED FOR DIMMING LIGHT-EMITTING DIODES

(75) Inventor: Bruce Richard Roberts, Mentor-on-the-Lake, OH (US)

(73) Assignee: GE LIGHTING SOLUTIONS, LLC, East Cleveland, OH (US)

( * ) Notice: Subject to any disclaimer, the term of this patent is extended or adjusted under 35 U.S.C. 154(b) by 561 days.

(21) Appl. No.: 13/290,589

(22) Filed: Nov. 7, 2011

(65) Prior Publication Data
US 2013/0113389 A1    May 9, 2013

(51) Int. Cl.
   H05B 37/02    (2006.01)
   H05B 33/08    (2006.01)

(52) U.S. Cl.
   CPC ....... H05B 33/089 (2013.01); H05B 33/0815 (2013.01); H05B 33/0851 (2013.01); *Y02B 20/346* (2013.01)

(58) Field of Classification Search
   CPC .......... H05B 33/0815; H05B 33/0845; H05B 33/0851; H05B 33/0818; H05B 37/02; H05B 37/0263; H05B 33/089; H05B 39/048; H05B 39/08
   USPC .... 315/247, 291, 293–294, 316, 209 R, 224, 315/297, 307–308; 362/227, 543, 555, 362/612, 800
   See application file for complete search history.

(56) References Cited

U.S. PATENT DOCUMENTS

| | | | |
|---|---|---|---|
| 7,710,050 B2 | 5/2010 | Preston et al. | |
| 7,759,881 B1 | 7/2010 | Melanson | |
| 2005/0017656 A1* | 1/2005 | Takahashi | H05B 41/24 315/248 |
| 2007/0024213 A1* | 2/2007 | Shteynberg et al. | 315/291 |
| 2008/0224636 A1* | 9/2008 | Melanson | 315/307 |
| 2008/0246416 A1* | 10/2008 | Jones | F21L 4/00 315/294 |
| 2009/0302766 A1 | 12/2009 | Behr et al. | |
| 2010/0019692 A1* | 1/2010 | Kimura | 315/294 |
| 2010/0033095 A1 | 2/2010 | Sadwick | |
| 2010/0259956 A1* | 10/2010 | Sadwick et al. | 363/50 |

(Continued)

FOREIGN PATENT DOCUMENTS

| | | |
|---|---|---|
| WO | 2006107199 A2 | 10/2006 |
| WO | 2008056321 A1 | 5/2008 |

OTHER PUBLICATIONS

Search Report and Written Opinion from corresponding PCT Application No. PCT/US2012/058947, dated Feb. 8, 2013.

*Primary Examiner* — Douglas W Owens
*Assistant Examiner* — Amy Yang
(74) *Attorney, Agent, or Firm* — GE Global Patent Operation; Peter T. DiMauro

(57) ABSTRACT

A lighting device with a drive device for dimming light-emitting diodes. The drive device comprises a dimming component that operates a switch in response to both a change in an input power signal and a system temperature. In one example, the dimming device can include a waveform generator that generates a signal with a waveform having levels that change in response to changes in temperature. The waveform defines the time during which the switch is open and closed, thereby determining the period of time the LEDs are energized. By operating the LEDs in this manner, the drive device effectively dims the LEDs to reduce the operating temperature and cool the LEDs.

19 Claims, 2 Drawing Sheets

(56) References Cited

U.S. PATENT DOCUMENTS

| | | |
|---|---|---|
| 2011/0074292 A1* | 3/2011 | Maehara .......................... 315/32 |
| 2011/0115396 A1 | 5/2011 | Horvath et al. |
| 2011/0121760 A1 | 5/2011 | Harrison et al. |
| 2011/0140620 A1* | 6/2011 | Lin .................... H05B 37/0263 315/224 |
| 2011/0163696 A1* | 7/2011 | Huang ............... H05B 33/0845 315/309 |
| 2011/0169409 A1 | 7/2011 | Stasky et al. |
| 2011/0215725 A1* | 9/2011 | Paolini .......................... 315/153 |
| 2011/0285308 A1 | 11/2011 | Crystal |

* cited by examiner

LIGHTING DEVICE INCLUDING A DRIVE DEVICE CONFIGURED FOR DIMMING LIGHT-EMITTING DIODES

BACKGROUND

Technical Field

The subject matter of the present disclosure relates to lighting devices and, more particularly, to providing thermal protection and dimming in lighting devices that comprise light-emitting diodes (LEDs).

Description of Related Art

Incandescent light bulbs have been available for over 100 years. However, other light sources show promise as commercially viable alternatives to the incandescent light bulb. For example, light-emitting diodes (LEDs) are attractive as for use in lighting devices in part because of energy savings through high efficiency light output and environmental incentives such as the reduction of mercury.

Unfortunately, lighting devices that use LEDs are incompatible with certain configurations and applications. For example, LEDs often cannot replace incandescent bulbs that work in connection with a dimming circuit. Many facilities, such as homes and buildings, include light source dimming circuits (referred to herein as "dimmers"). Dimming a light source saves energy when operating a light source and also allows a user to adjust the intensity of the light source to a desired level.

BRIEF DESCRIPTION OF THE INVENTION

The present disclosure describes embodiments of a lighting device with light-emitting diodes (LEDs) and drive circuitry that can dim the LEDs. One advantage of the present embodiments, however, is that dimming occurs in response to changes in both the average input voltage and to the system temperature. This feature makes the lighting device compatible with external dimming switches and, moreover, maintains and prolongs the lifetime of the LEDs using a single robust and cost-effective design.

Other features and advantages of the disclosure will become apparent by reference to the following description taken in connection with the accompanying drawings.

BRIEF DESCRIPTION OF THE DRAWINGS

Reference is now made briefly to the accompanying drawings, in which.

Where applicable like reference characters designate identical or corresponding components and units throughout the several views, which are not to scale unless otherwise indicated.

DETAILED DESCRIPTION OF THE INVENTION

Figure 1:
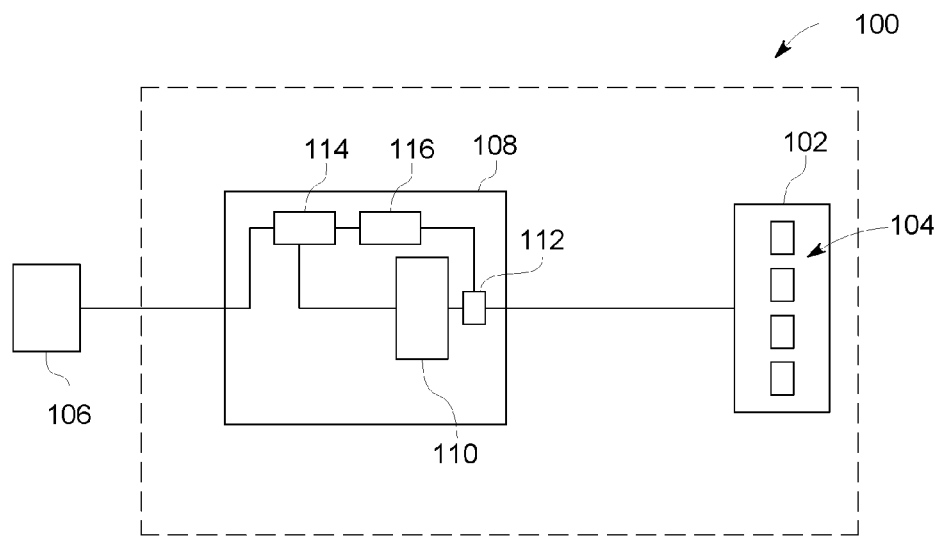
FIG. 1 depicts a block diagram of an exemplary lighting device.

FIG. 1 illustrates a block diagram of an exemplary lighting device 100 with thermal protection features that do not require an input signal representative of temperature. The lighting device 100 has a light engine 102 with one or more light-emitting diodes (LEDs) 104 as the primary light source. An external switch 106 regulates an input power signal (e.g., alternating current (AC)) to the lighting device 100. Examples of the external switch 106 include toggle and dimmer switches found in a household or an office. The lighting device 100 can replace existing light-generating devices, e.g., incandescent light bulbs, compact fluorescent bulbs, etc. For example, the lighting device 100 can substitute for any one of the variety of A-series (e.g., A-19) incandescent bulbs found in conventional lighting devices.

In the present example, the lighting device 100 includes a drive device 108 that couples with the light engine 102 to operate the LEDs 104. The drive device 108 has a dimming component 110 and a switch 112, which work in concert to change operation of the LEDs 104. The drive circuit 108 also includes one or more converter components (e.g., a rectifier 114 and a power converter 116) to modify the input power signal. In one example, the drive device 108 includes an AC-DC converter (e.g., the rectifier 114) and a DC-DC converter (e.g., the power converter 116) and/or combinations of components that convert an AC input (e.g., the input power signal) to an LED input signal suited to energize the LEDs 104.

The components of the lighting device 100 can comprise various discrete electrical components (e.g., resistors, transistor, etc.) that reside on a substrate, e.g., a printed circuit board (PCB) or suitable substrate. These components can be found on the same and/or different substrates depending, for example, on construction and packaging constraints. In one embodiment, the dimming component 110 is integrated as part of the drive circuit 108, although one or more separate component structures that embody these devices also fall within the scope and spirit of the present disclosure.

Examples of the dimming component 110 provide both dimming features and thermal protection features for LED-based lighting devices, e.g., the lighting device 100. In one embodiment, the dimming component 110 changes a time period the switch 112 is in its closed position to modulate (or pulse width modulate (PWM)) the LED input signal that is provided to the LEDs 104, and which causes one or more of them to operate. These changes occur in response to changes in one or both of the AC input (e.g., a change in voltage) and temperature (e.g., a change in the temperature of the dimming component 110). For example, the dimming component 110 can switch the switch 112 in response to changes in the voltage of the AC input. Changes in this voltage are often caused by operation of the external switch 106 by an end user, who desires to dim the brightness of the lighting device 100. To dim the lighting device 100, the dimming component 110 responds to the lower (average) voltage of the AC input by maintaining the switch 112 in its open position longer than in its closed position. This feature reduces the time the LED input signal energizes the LEDs 104 and lengthens the time the LEDs 104 are not energized. This operation gives the visual impression that light from the lighting device 100 is dimmed This feature is also useful to reduce the heat the LEDs 104 generate, as discussed more below.

In one example, the thermal protection feature of the dimming component 110 takes advantage of the dimming features discussed above. However, rather than respond to changes in the AC input, the dimming component 110 modulates the LED input signal in response to changes in temperature of the dimming component 110 or the drive device 106, generally. As discussed more below, the dimming component 110 can comprises an element with properties, e.g., a turn-on voltage, that increases and decreases in a known or incremental pattern as the temperature of the element fluctuates higher and lower, e.g., in response to operation of the LEDs. During extended operation of the lighting device 100, the LEDs 104 generate heat that raises the temperature of the lighting device 100 and the dimming component 110 in particular. The increase in the temperature causes the dimming component 110 to switch the switch 112 and, effectively, modulate the LED input signal. In one embodiment, the resulting change in temperature causes the dimming component 110 to switch the switch 112 to pulse width modulate (PMW) the LED input signal to dim the LEDs 104. Although the dimming may not causes a noticeable change in the brightness of the LEDs 104, the dimming does lower the operating temperature within the lighting device 100. Lowering the operating temperature effectively changes the rate of modulation of the LED input signal, thereby causing the switch 112 to remain in its closed position for longer and longer periods of time.

Operation of the dimming component 110 in this manner reduces heat and prolongs the life of the LEDs 104. However, changes in the operation of the dimming component 110 does not require a temperature-sensitive component (e.g., a thermistor or thermocouple) to provide feedback about the temperature nor trigger dimming of the LEDs 104. Examples of the dimming component 110 automatically change operation of the switch 112 to provide both dimming and thermal protection without the need for quantitative valuation of temperature. This feature eliminates the temperature-sensitive components as well as any peripheral components necessary, e.g., to monitor the temperature sensitive components, to transmit and receive input signals from the temperature-sensitive components, and to process the input signals to implement appropriate changes in operation of the LEDs.

Figure 2:
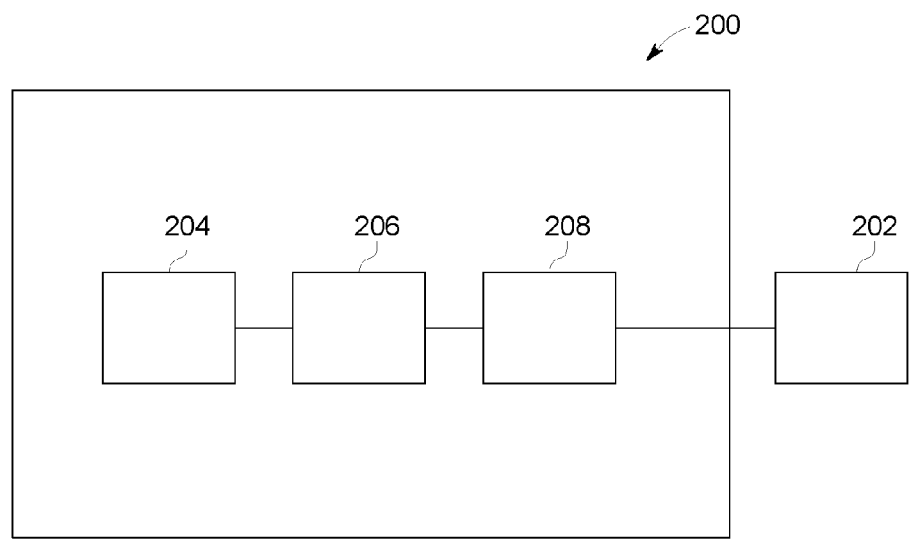
FIG. 2 depicts a block diagram of an exemplary thermal protection device for use in a lighting device such as the lighting device of FIG. 1.

For further illustration of these features, FIG. 2 depicts an exemplary dimming component 200 for use, in one embodiment, as the dimming component 110 of FIG. 1. The dimming component 200 operates a switch 202 (e.g., the switch 112 of FIG. 1) to conduct the LED input to the LEDs. The dimming component 200 includes a temperature compensation element 204 with a switch responsive to changes in temperature and a waveform generator element 206 that generates a signal having a waveform oscillating between low and high levels. A comparator element 208 receives the signal from the waveform generator element 206 and compares the levels (e.g., the high level) to a threshold value. The comparator element 208 generates a switching signal that operates the switch 202. Deviation of the levels from the threshold value can cause the comparator element 208 to open and/or close the switch 202 in accordance with the dimming mode and/or protection mode discussed above.

Operation of the switch of the temperature compensation element 204 adjusts the levels of the waveform in response to changes in temperature. In one example, the waveform can comprise a sawtooth waveform that ramps upward from a low voltage to a high voltage. Increasing the temperature of the temperature compensation element 204 causes a corresponding increase to the high voltage of the sawtooth waveform. The change in the high voltage can follow an incremental pattern in which the high voltage increases by an incremental value proportional to the change temperature of the temperature compensation element 204. In one example, in response to deviation of the high voltage above the threshold value, the switching signal actuates the switch 202 to pulse width modulate the LED signal in accordance with the protection mode above. As the temperature decreases, however, the temperature compensation element 204 can cause a corresponding decrease in the high voltage of the sawtooth waveform, which results in the switching signal maintaining the switch 202 in its closed position in accordance with the dimming mode above.

Figure 3:
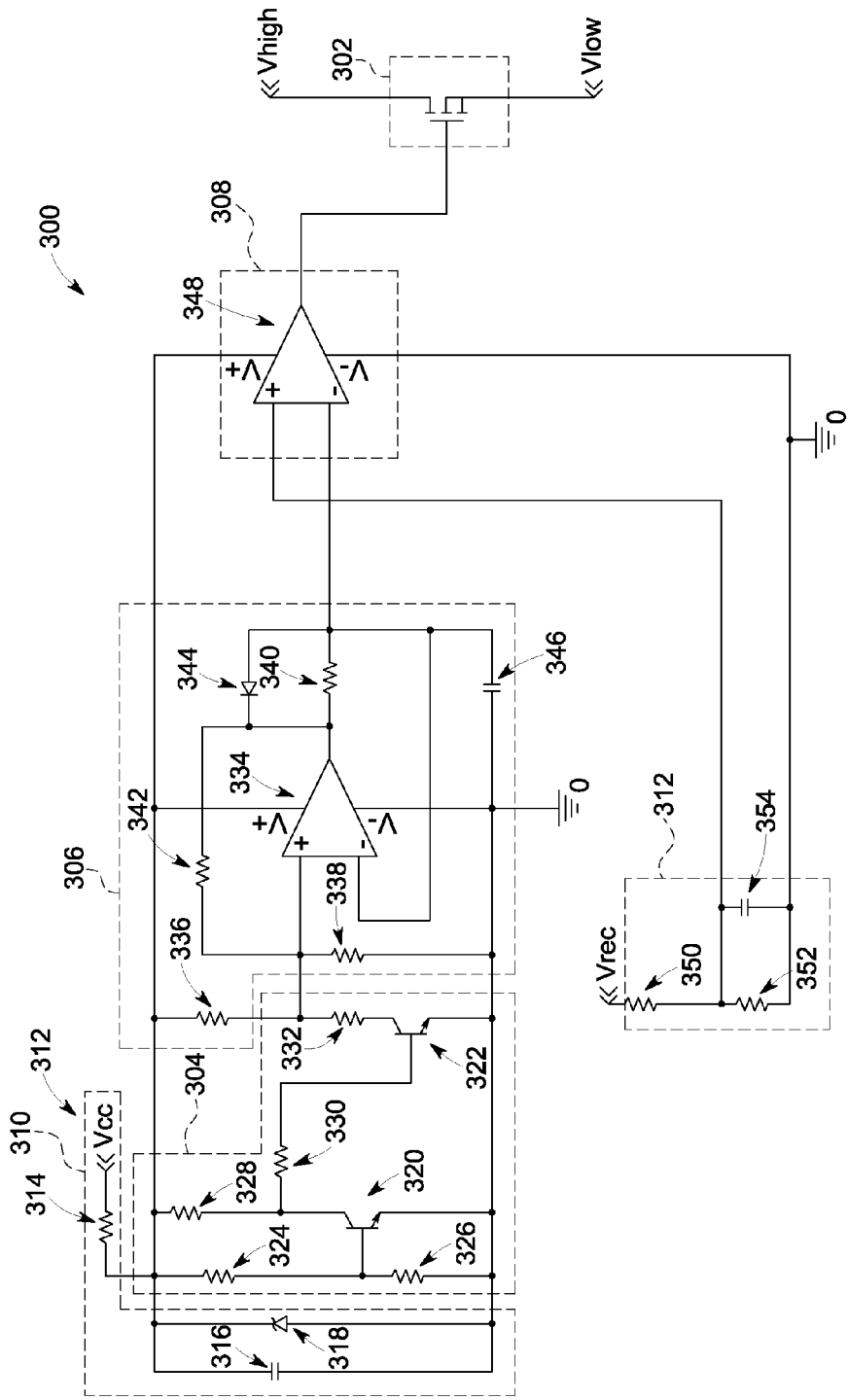
FIG. 3 depicts a schematic diagram of an exemplary topology for a thermal protection device such as the thermal protection device of FIG. 2.

FIG. 3 illustrates a schematic diagram of an exemplary topology for a dimming component 300 that can operate a switch 302. The dimming component 300 includes a temperature compensation element 304, a waveform generator 306, and a comparator element 308. A voltage circuit 310 and a filtering circuit 312 provide, respectively, a reference voltage and a line input representative average voltage (RAV) to the thermal protection device 300.

Moving from left to right in the diagram, the voltage circuit 310 includes a voltage supply 312 and a combination of discrete elements (e.g., a resistor 314, a capacitor 316, and a diode 318) to regulate voltage from the voltage supply 312. The temperature compensation element 304 includes a pair of transistors (e.g., a first transistor 320 and a second transistor 322) and a plurality of resistors (e.g., resistor 324, 326, 328, 330, and 332). In one example, the resistors 324, 326 form a voltage reference circuit that provides a reference voltage having a pre-determined value to the base of the first transistor 320. The resistors 328, 330 provide collector and base current limiting functions for, respectively, the first transistor 320 and the second transistor 322.

Example transistors include bipolar junction transistors (BJT), as well as related and derivative components (e.g., IGBTs, FETS, MOSFETS, etc.). These transistors can have operating parameters that are useful to the operation of the thermal protection device. For example, certain types of BJTs have operating parameters with known values for turn-on voltage (e.g., 0.7 V) as well as known response to changes in temperature. In one exemplary embodiment, the turn-on base to emitter voltage increases and decreases in a known or incremental pattern as the temperature of the transistor fluctuates higher and lower, e.g., in response to operation of the LEDs. The incremental pattern may follow a linear relationship, e.g., wherein the turn-on voltage changes at a rate of 2 mV/° C. In one embodiment, a Darlington pair can replace the first transistor 320 in the thermal compensation component 304. Examples of a Darlington pair include a pair of bipolar transistors connected to one another so that current amplified by one bipolar transistor is amplified by the other bipolar transistor. In one example, the Darlington pair can have a turn-on voltage of 1.4 V. Artisans skilled in the relevant arts will understand how to incorporate the Darlington pair or any of the other transistors into the topology of FIG. 3, therefore no details are provided herein.

The waveform generator 306 includes an op-amp 334, a plurality of resistors (e.g., resistors 336, 338, 340, and 342), a diode 344, and a capacitor 346. Collectively, these components provide a signal with known voltage profile or waveform. In one example, the components of the waveform generator 304 cause the signal to have a 1 kHz sawtooth waveform. The comparator element 308 includes an op-amp 348 that receives the signal from the op-amp 334. The op-amp 348 compares the voltage of the waveform to the RAV. The filtering circuit 312 includes a pair of resistors (e.g., resistors 350 and 352) and a capacitor 354. The filtering circuit 312 can couple to one of the converter components (e.g., the rectifier 112) discussed in connection with FIG. 1 above. The RAV is proportional to the input power signal the drive device receives, e.g., as regulated by a dimmer switch.

During normal operation, the RAV is higher than the voltage of the waveform (coming from the waveform generator 306), a condition which maintains the switch 302 closed and continuously conducting the LED input signal to the LEDs (not shown). During dimming operation, the reference voltage is less than the turn-on voltage for the first transistor 320. This configuration maintains the first transistor 320 is in its open position and the second transistor 322 is in its closed position. With the second transistor 322 closed, the resistor 332 is in parallel with the resistor 338. The combination of these two resistors determines the voltage of the waveform to cause dimming to occur.

One advantage of the present design is that if the voltage of the input power signal drops, e.g., because of an external dimming input from operation of a dimming switch, the RAV drops below the voltage of the waveform for at least part of the waveform duty cycle. This condition causes dimming to occur and switches the switch 302 to its open position for every portion of the waveform duty cycle that is less than the RAV. This feature effectively pulse width modulates the LED input signal at longer and longer off times as the input power signal is lowered, which dims the LEDs.

In one embodiment, as the first transistor 320 warms during extended use, the turn-on voltage necessary to change the first transistor 320 from its open position to its closed position decreases in accordance with the incremental pattern discussed above. Thermal protection occurs when the turn-on voltage reaches the reference voltage. In this condition, the first transistor 320 changes to its closed position, which causes the second transistor 322 to turn to its open position, decoupling the resistor 332 from the waveform generator 306. Without the resistor 332 in combination with the resistor 338, the voltage of the waveform increases above the threshold value, thereby pulse width modulating (PWM) the LED input signal, as discussed above.

As used herein, an element or function recited in the singular and proceeded with the word "a" or "an" should be understood as not excluding plural said elements or functions, unless such exclusion is explicitly recited. Furthermore, references to "one embodiment" of the claimed invention should not be interpreted as excluding the existence of additional embodiments that also incorporate the recited features.

This written description uses examples to disclose embodiments of the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A drive device for operating a light-emitting diode, said drive device comprising:
    a switch coupled to the light-emitting diode;
    a dimming component coupled to the switch, the dimming component comprising:
        a temperature compensation element responsive to a change in a temperature of the dimming component;
        a waveform generator configured to generate a sawtooth waveform that ramps from a low voltage to a high voltage;
    wherein an increase in the temperature of the dimming component causes an increase to the high voltage of the sawtooth waveform, the increased high voltage configured to cause the switch to modulate an LED input signal to dim the light-emitting diode; and
    a voltage input to the dimming component that is responsive to an AC input voltage, a decrease in the voltage input configured to cause the switch to modulate the LED input signal to dim the light emitting diode.

2. The drive device of claim 1, wherein the increased high voltage exceeds a line input representative average voltage of the AC input voltage.

3. The drive device of claim 2, wherein the line input representative average voltage decreases as the AC input voltage decreases and a value of the increased high voltage of the signal needed to cause the switch to modulate the LED input signal to dim the light-emitting diode is reduced.

4. The drive device of claim 1, wherein the dimming component comprises a transistor having a turn-on base to emitter voltage that changes in response to the change in the temperature of the dimming component, and wherein actuation of the transistor when the turn-on voltage is reached causes the increase to the high voltage of the sawtooth waveform.

5. The drive device of claim 4, wherein the transistor comprises a bipolar junction transistor.

6. The drive device of claim 4, wherein the transistor comprises a Darlington pair.

7. The drive device of claim 1, further comprising one or more converter components to change the AC input voltage to an LED input signal, wherein the switch modulates the LED input signal to the light-emitting diode based on the voltage input and the temperature of the dimming component.

8. An apparatus, comprising:
    a light engine comprising a light-emitting diode;
    a switch coupled to the light engine; and
    a comparator coupled to the switch, the comparator configured to receive a first signal having a sawtooth waveform that ramps from a low voltage and a high voltage, and a second signal having a line input representative average voltage, the comparator generating a switching signal that switches the switch to increase an OFF time of the light-emitting diode when the high voltage of the first signal exceeds the line input representative average voltage,
    wherein an increase in temperature of said apparatus actuates a transistor that changes the high voltage of the first signal having a sawtooth waveform to an increased high voltage, the increased high voltage of the first signal switching the switch to increase the OFF time of the light-emitting diode; and
    wherein a decrease in the line input representative average voltage causes the switch to increase the OFF time of the light-emitting diode and lowers a value of the first signal needed to exceed the line input representative average voltage.

9. The apparatus of claim 8, further comprising a pair of transistors coupled to the comparator, wherein the increase in temperature opens and closes the transistors to change the high voltage to the increased high voltage and causes the comparator to generating the switching signal that switches the switch to increase an OFF time of the light-emitting diode when the increased high voltage exceeds the line input representative average voltage.

10. The apparatus of claim 9, further comprising a voltage divider circuit coupled to the transistors, wherein the increase in temperature decouples a resistor from the voltage divider.

11. The apparatus of claim 8, wherein a decrease in the temperature of said apparatus changes the increased high voltage to the high voltage, the high voltage being less than the line input representative average voltage.

12. The apparatus of claim 8, wherein the OFF time of the switching of the switch increases in response to a decrease in the line input representative average voltage.

13. A lighting device, comprising:
a light engine comprising a light-emitting diode;
a first switch coupled to the light engine and configured to modulate an input signal to the light engine; and
a dimming component coupled to the first switch, the dimming component comprising a waveform generator configured to generate a sawtooth waveform that ramps from a low voltage to a high voltage
wherein an increase in temperature of the dimming component changes the high voltage to an increased high voltage that actuates the first switch to modulate the input signal to dim the light-emitting diode; and
a dimmer switch configured to control an AC input power to the dimming component to dim the light-emitting diode, the dimming component configured to generate a line input representative voltage based on the AC input power to the dimming component, wherein the increased high voltage actuates the first switch to modulate the input signal to dim the light-emitting diode only when the increased high voltage exceeds the line input representative average voltage.

14. The lighting device of claim 13, wherein the dimming component comprises a temperature compensation element with a second switch responsive to the increase in temperature, and wherein actuation of the second switch changes the high voltage to the increased high voltage.

15. The lighting device of claim 14, wherein the dimming component comprises a Darlington pair responsive to the increase in temperature, wherein actuation of the Darlington pair changes the high voltage to the increased high voltage.

16. The lighting device of claim 13, wherein the sawtooth waveform comprises a frequency of 1 kHz or more.

17. The lighting device of claim 13, wherein the dimming component comprises a transistor with a turn-on base to emitter voltage that varies in response to the increase in temperature, and wherein the variation follows a linear relationship.

18. The lighting device of claim 17, wherein the turn on voltage is 0.7 V or more.

19. The lighting device of claim 13, wherein a decrease in the AC input power by the dimmer switch correspondingly reduces the line input representative average voltage and reduces a magnitude of the second value required to actuate the first switch to modulate the input signal to dim the light-emitting diode.

* * * * *